June 28, 1955  E. I. HARMAN  2,711,711
TUNING APPARATUS
Filed June 10, 1953
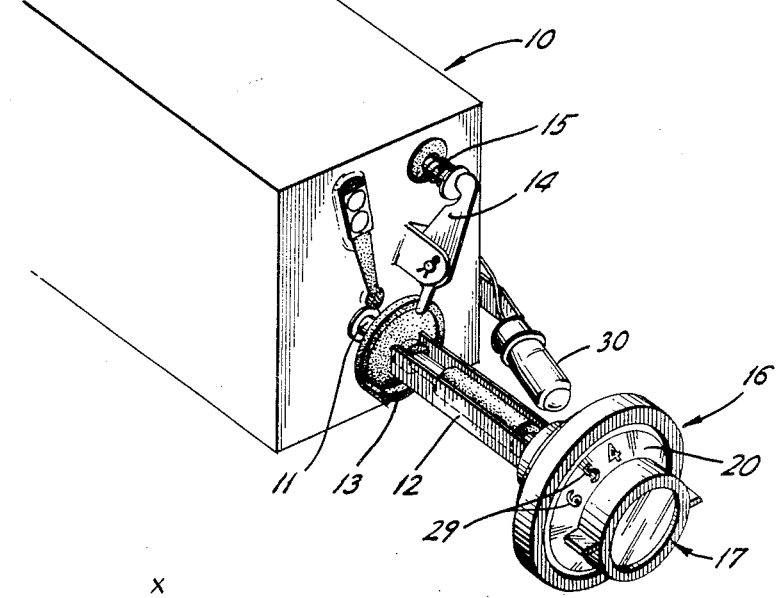
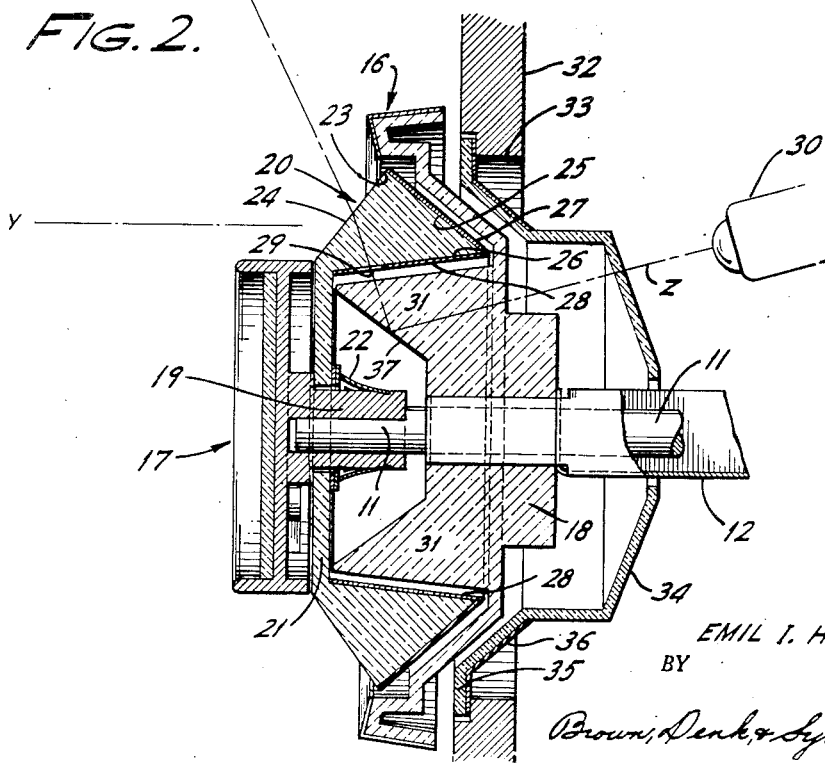
INVENTOR.
EMIL I. HARMAN
BY
Brown, Denk, & Synnestvedt
AGENTS United States Patent Office 2,711,711
Patented June 28, 1955

2,711,711

TUNING APPARATUS

Emil I. Harman, Philadelphia, Pa., assignor to Philco Corporation, Philadelphia, Pa., a corporation of Pennsylvania Application June 10, 1953, Serial No. 360,675

7 Claims. (Cl. 116—124.4)

My invention has to do with control apparatus and is especially concerned with manually operable control equipment of a kind commonly used in electrical apparatus such, for example, as radio or television receivers.

While of broader applicability the apparatus of the present invention is particularly adapted for use with television equipment, and for this reason the accompanying drawing and the following detailed description present the invention in that environment. Specifically, the invention is illustrated and described as embodied in control apparatus utilized with the channel selector of a television receiver.

Broadly, it is an object of my invention to provide a simple, composite, structure which includes knob elements serving not only as control means for associated electrical apparatus, but also being cooperable to indicate the setting, or position of adjustment, of the apparatus being controlled.

In apparatus of the kind to which the invention is particularly applicable, and especially in the field of television equipment, it has been known to combine an illuminated tuning dial with the channel selector, or with some other adjustable element of the receiver, but it has been found that use of such an illuminated dial has been disadvantageous, the presence of extraneous light, particularly in the vicinity of the image screen, being annoying and distracting to those viewing the picture. It has been recognized that a source of light situated in the vicinity of the viewing screen serves, to an extent dependent upon the brightness of said source, to reduce the iris opening in the eye of the viewer, which of course may under some conditions seriously interfere with proper viewing of the images displayed upon the screen. On the other hand the absence of an illuminated dial renders the apparatus difficult to tune and adjust, and particularly is this the case since television receivers are frequently utilized in darkened or only semi-lighted rooms.

With the foregoing in mind it is a particular object of this invention to provide a composite tuning instrumentality and indicating dial, in which the illuminated indicia of the dial is visible only from a predetermined restricted location, that is, along a line of sight displaced and, most conveniently, elevated with respect to the line of sight of seated viewers.

The invention is featured by the fact that the apparatus thereof includes selectively operable knobs providing individual control of two different receiver components—for example the channel selector and the device used to effect fine tuning adjustments—which knobs are cooperable to provide illuminated dial indications of the kind above mentioned.

To the foregoing general ends, there is provided by my invention a pair of knob elements each disposed for driving relation with a corresponding shaft to be controlled, said knob elements being independently rotatable to provide for selective control of the angular position of each shaft; one of said knob elements is configured to provide a generally annular transparent prism, advantageously triangular in cross-section, and the other of said knob elements is configured to provide internally reflective surfaces cooperable with a light source to re-direct light from said source and provide illumination at indicia associated with one face of the prism.

The manner in which the foregoing and other objects and constructional features of the invention may best be realized, will be understood from a consideration of the accompanying drawing taken in conjunction with the following detailed description.

In the drawing:

Figure 1 is a view, in perspective, illustrating knob structure embodying the principles of the present invention and showing, fragmentarily, tuning apparatus having associated drive shafts arranged in driven relation with respect to said knob structure; and, Figure 2 is a sectional view, on an enlarged scale, illustrating constructional details and optical characteristics of knob structure of the kind illustrated in Figure 1.

Now making more detailed reference to the drawing, and with initial emphasis on Figure 1 thereof, there is illustrated apparatus to be controlled, this apparatus taking the form of a channel selector and associated fine tuning means of a kind commonly used in television receivers. This channel selector is designated, in its entirety, by the reference numeral 10 and will be understood to include suitable switching means and means for effecting fine tuning adjustments about any frequency selected by actuation of said switching means. Insofar as the present invention is concerned the mentioned switching and tuning means may be of any desired type and, accordingly, specific illustration and description thereof is not necessary herein.

Extending outwardly of the forward wall of the channel selector 10 is a pair of concentrically arranged control shafts 11 and 12, the outer shaft 12 being of channel form and being provided at its inner end with a cam member 13 rotatable with said shaft 12 and adapted to actuate a lever 14 suitably connected, through a pin 15, with fine tuning apparatus disposed within the channel selector 10. The inner shaft 11 is utilized to actuate the switching means referred to above.

Carried by the outer ends of the control shafts are a pair of rotatable concentrically arranged control elements or knobs 16 and 17, the knob 16 having a hub or boss 18 drivingly engaging the fine tuning shaft 12. The knobs are independently rotatable in accordance with known practice and effect selective control of the switch structure and of the tuning apparatus. The knob 17 is a composite structure formed of a forward part adapted to be manually actuated and a rear section 20, which is more or less toroidal in configuration. Said portion 20 is provided with a web or hub structure 21 suitably apertured to receive the shaft-actuating hub 19 of the knob 17, and is arranged to be driven by said knob 17 through the intermediation of a lock washer 22, which reacts against the hub 19 and the web 21 to maintain the generally toroidal portion 20 in driven relation with the knob 17. As appears in Figure 2, the portion 20 is of triangular cross-section, in a plane extending radially of the knob and shaft assembly, and has a substantially right angular apex angle 23, a pair of lateral faces 24 and 25, and a base 26. Portion 20 is formed of transparent material, such for example as "Lucite," and has the optical characteristics of a prism of annular or toroidal form. Geometrically the portion 20 is a figure of revolution generated by swinging the triangle 24, 25, 26 about the axis of rotation of the knob structure.

The face 25 and the base 26 are each provided with an opaque covering, 27 and 28, respectively, the covering 28 having transparent areas 29 shaped to define dial indicia as clearly appears in Figure 1. As will be fully described hereinafter, this indicia is illuminated by novel means and is clearly visible along the elevated line of sight shown at x, but is completely invisible along the line of sight of seated viewers, which latter line of sight is represented at y.

Now making reference to the tuning knob 16 it will be seen that this knob is also a composite structure having an outer manually operable portion, through the agency of which shaft 12 is rotated, and a transparent annular extension 31 nested within the annular prism portion 20 and formed integrally with the hub 18 of knob 16. This annular extension 31 is also generally triangular in cross-section and is formed of transparent material which, preferably, is similar to the material of which portion 20 is formed. The annular extension 31 of knob element 16 is cooperable with a light source 30 to illuminate the indicia 29, as will later appear.

The above-described elements are illustrated in Figure 2 as assembled with the cabinet of a television receiver or the like, a wall portion of the cabinet being shown at 32. This wall portion is suitably apertured, as appears at 33, to permit mounting of the knob assembly with the rear portions of knob 16 extending somewhat inwardly of the cabinet. To prevent light from the source 30 from being visible exteriorly of the cabinet, there is provided a generally conical shield 34, having a flange portion 35 engaging the wall 32 just outwardly of the aperture 33 and being centrally apertured to accommodate the control shafts. This shield is transparent to permit light to illuminate the indicia 29, but peripheral portions of the shield are provided with an opaque coating, shown at 36, to prevent passage of light outwardly of the cabinet behind the knob structure, as aforesaid.

The control functions served by the composite knob structure 16—17 will be understood without further description. The manner in which the knob elements serve also to provide illumination of the dial indicia 29 will now be described.

Light from the source 30 (see the representative ray shown at z, and extending along the above-mentioned line of sight x) enters the hub structure of knob element 16, passes through the transparent material of the annular portion 31 and arrives at the surface 37 at such an angle—less than the critical angle—as to be reflected internally of the portion 31, and thence passes upwardly through indicia 29, to illuminate the same. As is shown by line of sight x, light from the indicia is visible through a predetermined restricted solid angle of which the line of sight x may be considered to be indicative of the midplane.

Since annular portion 20 of knob element 17 has the optical characteristics of a prism, and since indicia 29 is placed against the prism base 26, rather than being intimately bonded with said base, there exists a thin film of air between the indicia and the exterior surface of the base 26, that is, there exists between the indicia and the prism an incremental layer having an index of refraction different from that of the prism. Due to the presence of this incremental layer, and as is well known, any light from the indicia which intersects the adjacent base surface 26 at an angle equal to or less than the critical angle does not enter the prism, and light cannot therefore be propagated along the line of sight y. Any such light is totally reflected and does not enter the prism.

Any light from the indicia 29 which reaches the rear face 25 of the prism either arrives at the latter face at such an angle that it passes through said surface 25, rather than being reflected backwardly along the line of sight y, or it arrives at an angle such as to cause it to be reflected downwardly toward a location from which it is not visible. The purpose served by the covering 27 is, of course, to prevent light from the lamp passing through the faces 25 and 24 and arriving at the normal viewing location, that is, being propagated along the line of sight y.

It will be noted that the light source 30 is fixed, whereas the two knob elements are of course rotatable, and this is of importance since it results in providing illumination at the upwardly presented portion of the indicia regardless of the angular position of adjustment of either of the control knobs. For this reason there is always displayed in the upper sector of portion 20 of knob 17 a dial indication of the frequency to which the equipment is adjusted to respond.

From the foregoing description it will be understood that by the present invention there is provided tuning or adjusting apparatus in which manually operable elements not only serve control functions, but also constitute parts of a novel optical system effective to provide dial indications visible in only a predetermined restricted location.

I claim:

1. Controlling and indicating apparatus adapted for use with a pair of shafts, said apparatus comprising: a pair of concentrically arranged knob elements each disposed for driving relation with a corresponding shaft, said knob elements being independently rotatable to provide for selective control of the angular position of each shaft and one of said knob elements being configured to provide an annular transparent prism generally triangular in cross-section; the other of said knob elements also being configured to provide an annular transparent prismatic structure having an internally reflective surface adapted to direct light toward said prism; indicia so associated with said prism as to be visible through said prism only from a predetermined restricted location; and means for providing light at said prismatic structure for re-direction by said internally reflective surface and impingement upon said indicia.

2. In indicating and controlling apparatus adapted for use with a pair of shafts, shaft-controlling and position-indicating means, comprising: a pair of knob elements each disposed for driving engagement with a corresponding one of said shafts, said knob elements being independently rotatable to provide for selective control of the angular position of each shaft; one of said knob elements being provided with a transparent generally toroidal portion of triangular cross-section in planes taken radially of the said one knob element, said portion having the optical characteristics of a prism; indicia confronting a face of said prism, said indicia being so disposed and the faces of said prism being so angularly related that said indicia is visible through said prism only from a predetermined restricted location; a light source; and means for illuminating said indicia comprised of a second transparent generally toroidal portion forming part of the other of said knob elements, said latter portion being cooperable with said light source to cause light to impinge upon said indicia.

3. Indicating and controlling apparatus adapted for use with a pair of shafts, comprising: a pair of knob elements each adapted for driving engagement with a corresponding shaft, said knob elements being independently rotatable to provide for selective control of the angular position of the associated shafts; one of said knob elements being provided with a surface which is at least a portion of a figure of revolution about the axis of rotation of said one knob element; indicia associated with said surface, the construction and arrangement being such that said indicia is visible only from a predetermined restricted location; a light source; and means for illuminating said indicia comprised of a second surface which forms part of the other of said knob elements and which is at least a portion of a figure of revolution about the axis of rotation of said other knob element, said second surface being cooperable with said light source to direct light therefrom upon said indicia.

4. In combination with a pair of concentrically arranged shafts, shaft-controlling and position-indicating means, comprising: a pair of concentrically arranged knob elements each disposed in driving engagement with a corresponding one of said shafts, said knob elements being independently rotatable to provide for selective control of the angular position of each of said shafts; one of said knob elements being provided with a surface which is at least a portion of a figure of revolution about the axis of rotation of said shafts; indicia associated with said surface, the construction and arrangement being such that said indicia is visible only from a predetermined restricted location; a light source; and means for illuminating said indicia comprised of a second surface which forms part of the other of said knob elements and which is at least a portion of a figure of revolution about the axis of rotation of said shafts, said second surface being cooperable with said light source to direct light therefrom upon said indicia.

5. Controlling and indicating apparatus adapted for use with a shaft, said apparatus comprising: a knob element rotatably mounted to provide control of the angular position of an associated shaft, said knob element being configured to provide a generally annular transparent prism comprising, in cross-section taken radially of said rotatable knob element, a triangle having a predetermined apex angle, a base, and a side presented toward a predetermined restricting viewing location; indicia associated with that face of the prism which, in cross-section, comprises the base of said triangle; and means for providing illumination at said indicia.

6. Controlling and indicating apparatus adapted for use with a shaft, said apparatus comprising: a knob element rotatably mounted to provide control of the angular position of an associated shaft, said knob element being configured to provide a generally annular transparent prism; indicia so associated with said prism as to be visible through the prism only from a predetermined restricted location; means for providing illumination at said indicia; and a second knob element disposed concentrically with respect to said first-mentioned knob element, said second knob element including a generally annular reflective surface cooperable with said illuminating means to direct light toward said indicia.

7. Controlling and indicating apparatus adapted for use with a shaft, said apparatus comprising: a knob element rotatably mounted to provide control of the angular position of an associated shaft, said knob element being configured to provide a generally annular transparent prism; indicia so associated with said prism as to be visible through the prism only from a predetermined restricted location; means for providing illumination at said indicia; and a second knob element disposed concentrically with respect to said first-mentioned knob element, said second knob element including a rotatable generally annular prismatic structure lying closely adjacent to said indicia and having an internally reflective surface cooperable with said illuminating means to direct light toward said indicia.

References Cited in the file of this patent
UNITED STATES PATENTS
2,607,873    Sheidler _____ Aug. 19, 1952